(12) United States Patent
Hamauzu

(10) Patent No.: US 10,237,255 B2
(45) Date of Patent: Mar. 19, 2019

(54) DATA SYNCHRONIZING SYSTEM, CONTROL METHOD THEREOF, AUTHORIZATION SERVER, AND STORAGE MEDIUM THEREOF

(71) Applicant: CANON KABUSHIKI KAISHA, Tokyo (JP)

(72) Inventor: Susumu Hamauzu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 14/794,584

(22) Filed: Jul. 8, 2015

(65) Prior Publication Data
US 2016/0014107 A1 Jan. 14, 2016

(30) Foreign Application Priority Data
Jul. 10, 2014 (JP) .................. 2014-142726

(51) Int. Cl.
| G06F 7/04 | (2006.01) |
| G06F 15/16 | (2006.01) |
| G06F 17/30 | (2006.01) |
| H04L 29/06 | (2006.01) |
| H04L 29/08 | (2006.01) |

(52) U.S. Cl.
CPC ............ H04L 63/08 (2013.01); H04L 63/10 (2013.01); H04L 67/1095 (2013.01); H04L 67/16 (2013.01)

(58) Field of Classification Search
USPC .......................................... 726/5
See application file for complete search history.

(56) References Cited

U.S. PATENT DOCUMENTS

| 5,999,947 A * | 12/1999 | Zollinger .......... G06F 17/30578 |
| 8,793,509 B1 * | 7/2014 | Nelson .................. G06F 21/335 |
| | | 380/227 |
| 8,805,951 B1 * | 8/2014 | Faibish ................. G06F 9/5072 |
| | | 709/213 |
| 9,773,051 B2 * | 9/2017 | Smith ............... G06F 17/30575 |
| 2004/0151300 A1 * | 8/2004 | Marwell .............. H04M 3/432 |
| | | 379/265.13 |
| 2005/0164651 A1 * | 7/2005 | Ollis ...................... G06Q 10/10 |
| | | 455/100 |
| 2006/0085485 A1 * | 4/2006 | Shimshoni ........ G06F 17/30368 |
| 2006/0224597 A1 * | 10/2006 | Fitzpatrick ........ G06F 17/30575 |
| 2009/0094332 A1 * | 4/2009 | Schemers, III ...... G06Q 10/107 |
| | | 709/206 |
| 2009/0172201 A1 * | 7/2009 | Carmel ................. H04L 67/104 |
| | | 709/248 |

(Continued)

FOREIGN PATENT DOCUMENTS

| JP | 2007-041976 A | 2/2007 |
| JP | 2011-065542 A | 3/2011 |
| JP | 2013-088901 A | 5/2013 |

*Primary Examiner* — Lynn D Feild
*Assistant Examiner* — Vadim Savenkov
(74) *Attorney, Agent, or Firm* — Canon U.S.A., Inc. IP Division

(57) ABSTRACT wherein the server system is configured to cause said other device to synchronize with the updated data in response to confirmation of identification information about said other device included in the identification information about the terminal transmitted by the transmission unit.

5 Claims, 14 Drawing Sheets

(56) References Cited

U.S. PATENT DOCUMENTS

| | | | | |
|---|---|---|---|---|
| 2013/0097686 A1* | 4/2013 | Towata | ............... | G06F 21/31 |
| | | | | 726/9 |
| 2013/0138738 A1* | 5/2013 | Li | ............... | H04L 65/403 |
| | | | | 709/204 |
| 2013/0151468 A1* | 6/2013 | Wu | ............... | G06F 17/30174 |
| | | | | 707/614 |
| 2014/0136599 A1* | 5/2014 | Shiue | ............... | H04L 67/1095 |
| | | | | 709/203 |
| 2015/0058287 A1* | 2/2015 | Zhang | ............... | G06F 17/30575 |
| | | | | 707/610 |
| 2015/0234712 A1* | 8/2015 | Fei | ............... | G06F 17/30088 |
| | | | | 707/639 |

* cited by examiner

FIG.4A

USER MANAGEMENT TABLE (1000)

| USER ID (1001) | PASSWORD (1002) |
|---|---|
| uid00000001 | ***** |
| uid00000002 | ****** |
| uid00000003 | ***** |
| | |

FIG.4B

CLIENT MANAGEMENT TABLE (1100)

| CLIENT ID (1101) | CLIENT NAME (1102) | PASSWORD (1103) | REDIRECT URI (1104) |
|---|---|---|---|
| client00000001 | DATA SYNCHRONIZATION SERVICE | ******* | https://datasync.example.com |
| | | | |

FIG.4C

DEVICE MANAGEMENT TABLE (1200)

| USER ID (1201) | DEVICE ID (1202) | DEVICE NAME (1203) | DEVICE TOKEN (1204) |
|---|---|---|---|
| uid00000001 | dev00000001 | user1_dev1 | APA91bHJDc0UZ... |
| uid00000001 | dev00000002 | user1_dev2 | u7lJI6DfjjHTe... |
| uid00000001 | dev00000003 | user1_dev3 | 18ITPaRC4Go5... |
| uid00000002 | dev00000004 | user2_dev1 | |
| | | | |

FIG.4D

SYNCHRONIZATION DATA MANAGEMENT TABLE (1300)

| DATA ID (1301) | USER ID (1302) | UPDATE DIVISION (1303) | FILE PATH (1304) | FILE NAME (1305) | RECEIPT TIME (1306) |
|---|---|---|---|---|---|
| dev00000001_sync0000001 | uid00000001 | ADDITION | /test/ | addfile.txt | 2014/04/30 |
| dev00000001_sync0000001 | uid00000001 | UPDATE | /test2/ | updatefile.txt | 2014/04/30 |
| dev00000001_sync0000001 | uid00000001 | DELETION | /test3/ | delfile.txt | 2014/04/30 |
|  |  |  |  |  |  |

FIG.4E

ACCESS TOKEN MANAGEMENT TABLE (1400)

| ACCESS TOKEN ID (1401) | TOKEN TYPE (1402) | EXPIRATION DATE (1403) | SCOPE ID (1404) |
|---|---|---|---|
| AT_000000 | AUTHORIZATION CODE | 2014/04/30 11:00 | ACQUISITION OF TERMINAL LIST |
| AT_000001 | ACCESS TOKEN | 2014/04/30 12:00 | ACQUISITION OF TERMINAL LIST |
| AT_000002 | ACCESS TOKEN | 2014/04/30 13:00 | ACQUISITION OF TERMINAL LIST |
| AT_000003 | ACCESS TOKEN | 2014/04/30 16:00 | ACQUISITION OF TERMINAL LIST |
|  |  |  |  |

| REFRESH TOKEN ID (1405) | REFRESH DEADLINE (1406) | CLIENT ID (1407) | USER ID (1408) |
|---|---|---|---|
|  |  | client00000001 | uid00000001 |
| RT_000001 | 2014/4/30 14:00 | client00000001 | uid00000001 |
| RT_000002 | 2014/4/30 15:00 | client00000001 | uid00000001 |
| RT_000003 | 2014/4/30 18:00 | client00000001 | uid00000002 |
|  |  |  |  |

| REDIRECT URI (1409) |
|---|
| https://datasync.example.com |
|  |
|  |
|  |

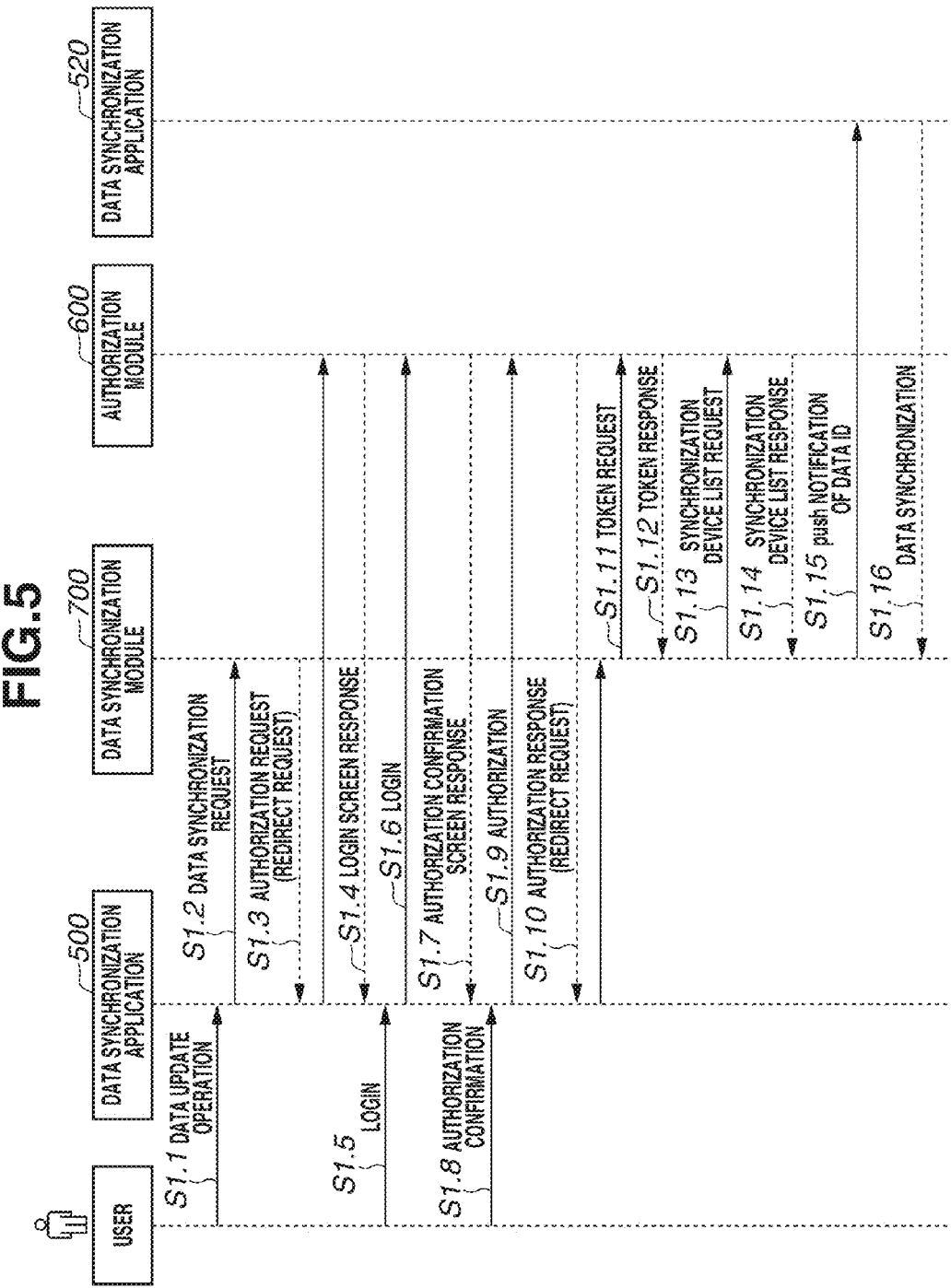

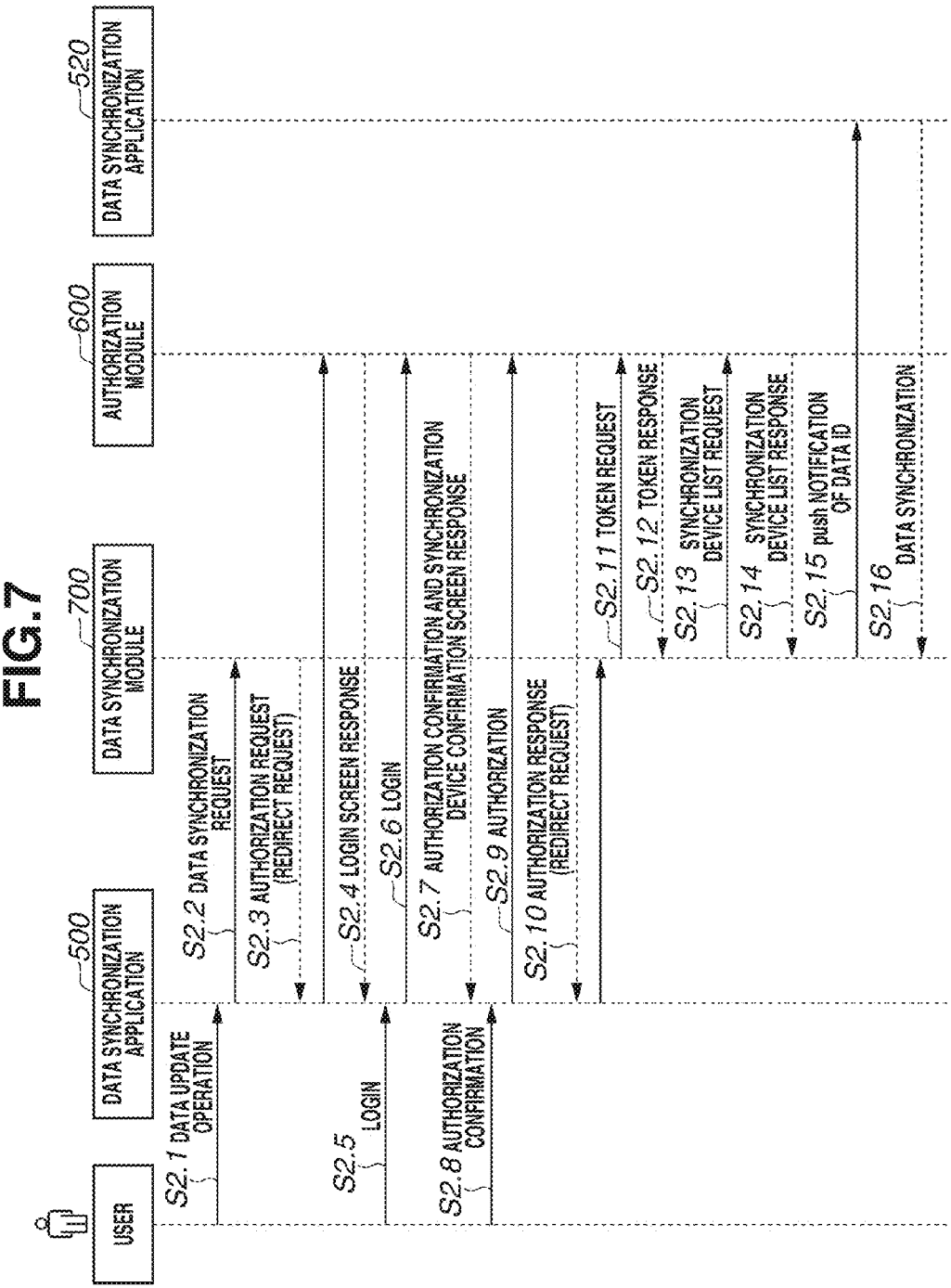

FIG.9

| _____1500_____ ||||| 
|---|---|---|---|---|
| SYNCHRONIZATION DEVICE STORAGE TABLE |||||
| 1501 | 1502 | 1503 | 1504 | 1505 |
| ACCESS TOKEN ID | USER ID | DEVICE ID | DEVICE NAME | DEVICE TOKEN |
| AT_000001 | uid00000001 | dev00000002 | user1_dev2 | u7IJI6DfjjHTe... |
| AT_000001 | uid00000001 | dev00000003 | user1_dev3 | 18ITPaRC4Go5... |
| | | | | |

DATA SYNCHRONIZING SYSTEM, CONTROL METHOD THEREOF, AUTHORIZATION SERVER, AND STORAGE MEDIUM THEREOF

BACKGROUND OF THE INVENTION

Field of the Invention

The present invention relates to a data synchronizing system that synchronizes data of a plurality of devices connected via a network, a method for controlling the data synchronizing system, an authorization server, and a storage medium for the data synchronizing system.

Description of the Related Art

According to one of recently available services, it is feasible to synchronize data among a plurality of devices via a system accessible via the internet. For example, as discussed in Japanese Patent Application Laid-Open No. 2011-065542, there is a service available to transfer dictionary information to all devices owned by a user when the dictionary information is updated. Further, as another service available when a photo is stored in a device, it is feasible to transfer the stored photo to other devices owned by a user. For example, Photo Stream is available to iCloud (registered trademark of Apple Inc.) users.

However, such a data synchronization service is not usable to realize data synchronization among a plurality of devices unless a list of devices owned by a user is acquired beforehand by the data synchronization service. According to the above-mentioned conventional services, each user is initially required to register a user own device list to the service so that the service can acquire the registered user own device list.

However, according to the above-mentioned method, it is unfeasible to provide the user own device list to a plurality of services. Therefore, each user is required to register own devices to each service. When a user adds or deletes a device, the user updates the user own device list for each of the plurality of services. Repeating the above-mentioned device adding or deleting operation for each service is troublesome when the user uses a plurality of data synchronization services.

Further, as another problem, there will be a higher risk of leaking information when a plurality of services manages a user own device list in a decentralized fashion. In many cases, if the decentralized management of the user own device list is performed among two or more services, the security measure will be independently determined by each service. If the service has a problem in the security measure, there will be a possibility of unintentionally leaking the user own device list. Further, providing the user own device list to other persons without any permission of the user may occur.

SUMMARY OF THE INVENTION

The present invention intends to solve at least one of the above-mentioned problems. The present invention enables a server to manage a user own device list in aggregative fashion if the server is reliable for a user and causes the server to provide the user own device list to another service only when the user permits.

According to an aspect of the present invention, a data synchronizing system includes a device that can update data, a server system that causes another device to synchronize with the updated data in response to the update of the data, and an authorization server. The data synchronizing system includes an authentication unit configured to determine whether a user is an authorized user based on authentication information input by the user via an authentication screen displayed by the device, an issuance unit configured to issue authority information indicating that authority of the user has been transferred to the server system in a case where the user determined by the authentication unit as the authorized user inputs an instruction permitting the authorization server to transfer the authority of the user to the server system via an authorization confirmation screen displayed by the device, and a transmission unit configured to transmit identification information about the device associated with the user to the server system based on the authority information transmitted when the server system requests the authorization server to provide identification information about the data synchronization target device. The server system is configured to cause said other device to synchronize with the updated data in response to confirmation of identification information about said other device included in the identification information about the device transmitted by the transmission unit.

Further features of the present invention will become apparent from the following description of exemplary embodiments with reference to the attached drawings.

BRIEF DESCRIPTION OF THE DRAWINGS

FIGS. 4A to 4E illustrate table structures that can be managed by an authorization server according to the present exemplary embodiment.

FIG. 5 is a sequence diagram illustrating token acquisition and data synchronization according to the present exemplary embodiment.

FIG. 7 is a sequence diagram according to a second exemplary embodiment of the present invention.

FIG. 9 illustrates a table structure according to a third exemplary embodiment of the present invention.

DESCRIPTION OF THE EMBODIMENTS

Figure 1:
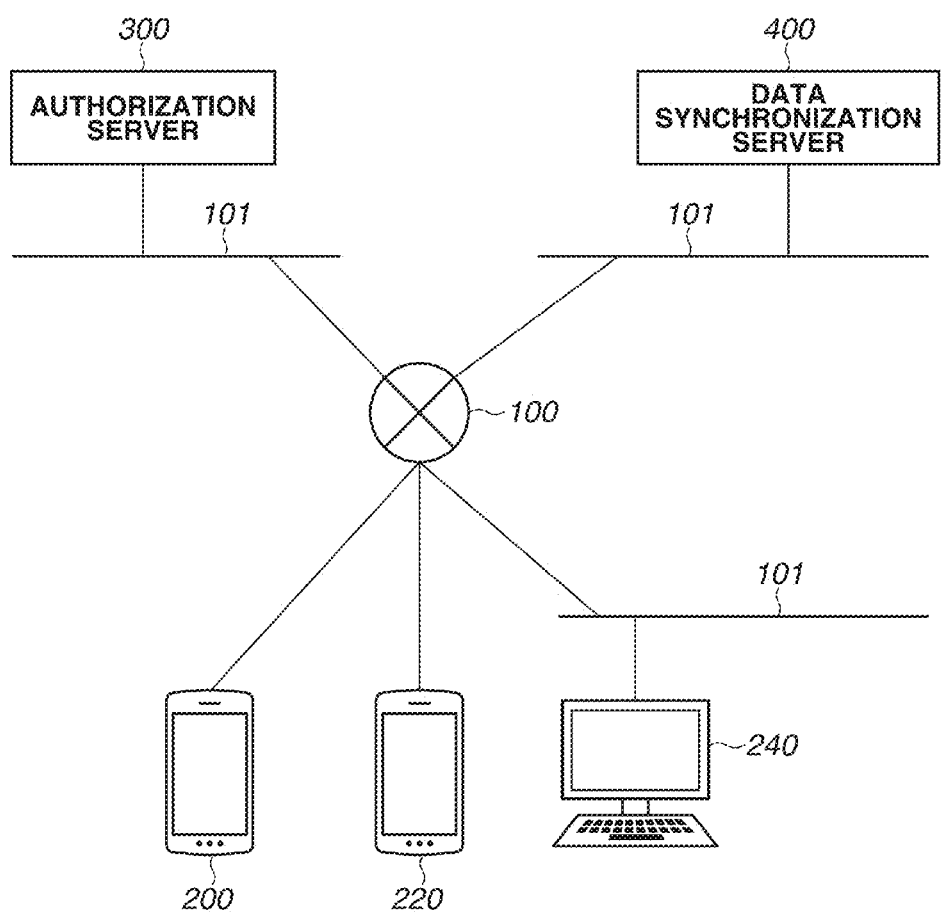
FIG. 1 is a diagram illustrating a configuration of a data synchronizing system.

A first exemplary embodiment will be described in detail below. A data synchronizing system according to the present exemplary embodiment has a network configuration illustrated in FIG. 1. In the present invention, a wide area network (WAN) 100 constitutes a World Wide Web (WWW) system. A local area network (LAN) 101 connects respective constituent components of the data synchronizing system. Users can operate devices 200, 220, and 240. The data synchronizing system further includes an authorization server 300 and a data synchronization server 400.

The devices 200, 220, and 240, the authorization server 300, and the data synchronization server 400 are mutually connected via the WAN 100 and the LAN 101. The authorization server 300 and the data synchronization server 400 can be constituted to belong to different LANs or can be constituted to belong to the same LAN. Further, the authorization server 300 and the data synchronization server 400 can be included in the same apparatus. Further, in the present exemplary embodiment, the data synchronizing system includes only one authorization server 300 and only one data synchronization server 400. However, the data synchronizing system can include a plurality of authorization servers and a plurality of synchronization servers. As mentioned above, the number of servers is not limited to a specific value. Therefore, the server system can be constituted by a single server or a plurality of servers.

The data synchronizing system according to the present exemplary embodiment enables the devices 200, 220, and 240, the authorization server 300, and the data synchronization server 400 to cooperate with each other via the network and realizes data synchronization among devices using OAuth (i.e., standard protocol to allow secure authorization). The OAuth is described in detail below.

According to the OAuth, data of a user managed by a service A can be accessed by an external service B recognized by the user. In this case, the service A clearly indicates a range accessible by the external service B and obtains explicit authorization of the user when accessed by the external service B. The explicit authorization by the user performed in this case is referred to as "authorization operation." When the user performs the authorization operation, the external service B can receive an authorization token from the service A. The authorization token proves that the access by the external service B has been recognized by the service A. Hereinafter, by using the authorization token, the external service B is accessible to the data of the user managed by the service A within the range approved by the service A. In this case, the authorization token is information indicating that the user authority is transferred to a cooperation request source, such as the external service B, and is referred to as authority information. In the OAuth, the service A is referred to as a resource server that provides a service. On the other hand, the external service B is referred to as a client that is a user of the service.

Next, the roles of each constituent component will be described in detail below. Each of the devices 200, 220, and 240 is an information device, such as a personal computer (PC), a tablet, a smartphone, or a feature phone. Users of respective devices can add, change, or delete data synchronization target files by operating their devices. The data synchronization target file is, for example, a document, a photo image, or dictionary data. Further, users can operate the devices to perform OAuth authorization operations. The authorization server 300 is operable as an OAuth authorization server or a resource server. The authorization server 300 is capable of requesting a user to perform an authorization operation and is capable of issuing an authorization token. The data synchronization server 400 is an OAuth client. The data synchronization server 400 can receive the authorization token from the authorization server 300 and can acquire a publicly opened resource (i.e., one of the services provided by the authorization server 300) by using the authorization token.

Figure 2:
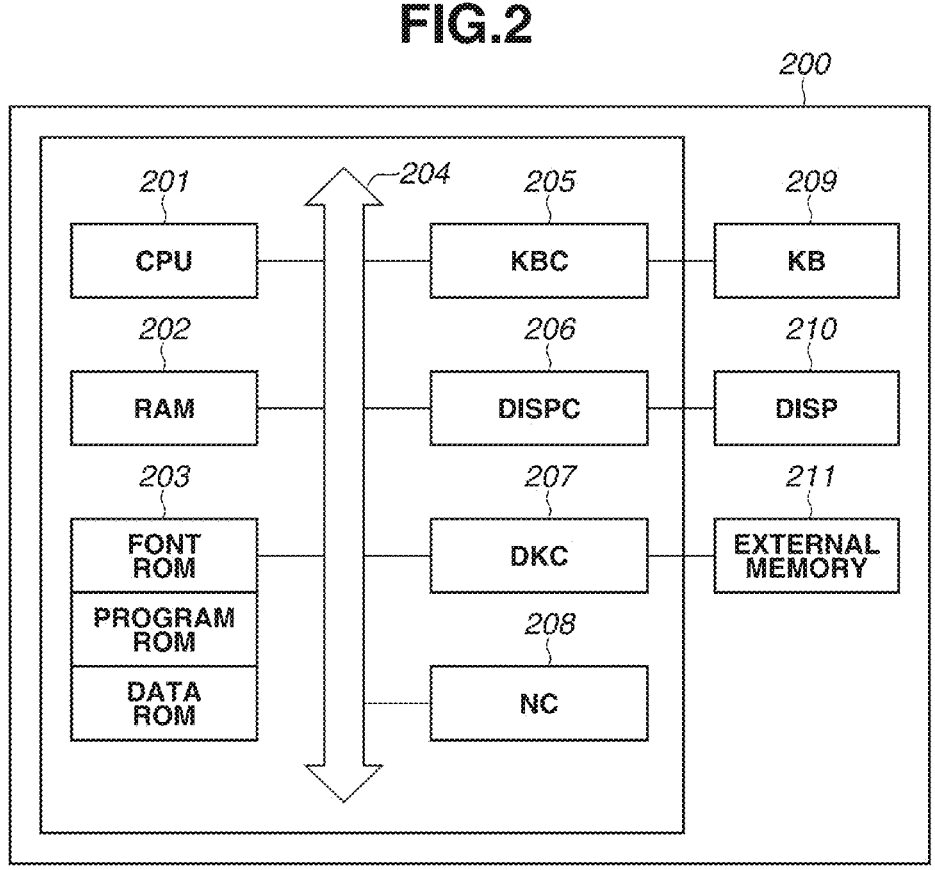
FIG. 2 is a diagram illustrating a hardware configuration of an apparatus that uses or provides services.

FIG. 2 illustrates a configuration of a device that uses a service according to the present exemplary embodiment or can provide a service according to the present exemplary embodiment. The hardware block diagram illustrated in FIG. 2 is comparable to a hardware block diagram of a general information processing apparatus. The hardware configuration of a general information processing apparatus is applicable to the devices 200, 220, and 240, the authorization server 300, and the data synchronization server 400 according to the present exemplary embodiment.

In FIG. 2, a central processing unit (CPU) 201 can execute a program, such as an operating system (OS) or an application, loaded into a random access memory (RAM) 202 from a program ROM of a read only memory (ROM) 203 or from an external memory 211. When the CPU 201 executes the program, each processing described below can be realized. The RAM 202 is functionally operable as a main memory or a work area for the CPU 201. A keyboard controller (KBC) 205 can control a key input from a keyboard 209 or a pointing device (not illustrated). A display controller (DISPC) 206 can control information to be displayed on a display device (DISP) 210. A disk controller (DKC) 207 can control each data access to an external memory 211 (e.g., a hard disk drive (HD) or a silicon disk (SSD)) that stores various data. A network card (NC) 208 is connected to the network and can perform processing for controlling communications with other devices accessible via the network. In the following description, unless otherwise mentioned, the CPU 201 is a main part of the hardware configuration and an application program installed on the external memory 211 is a main part of the software configuration.

Figure 3:
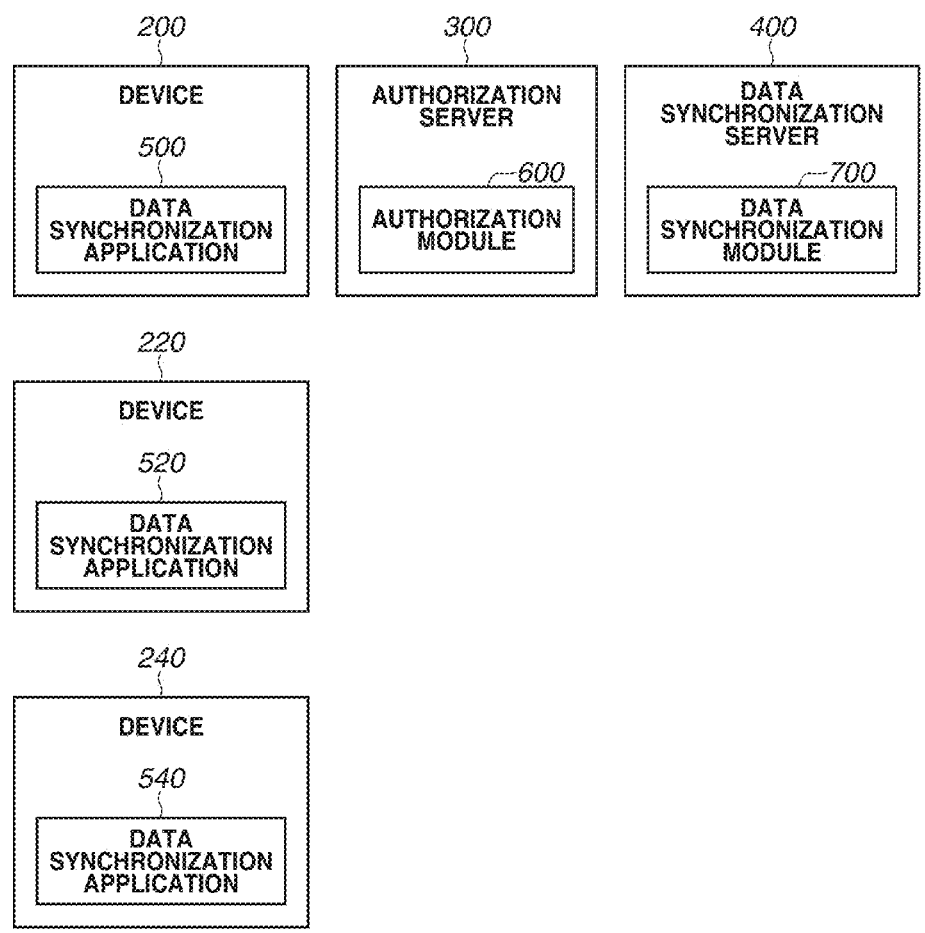
FIG. 3 is a diagram illustrating a software module configuration of each apparatus according to the present exemplary embodiment.

FIG. 3 illustrates a software module configuration of each apparatus according to the present exemplary embodiment. The devices 200, 220, and 240 include data synchronization applications 500, 520, and 540, respectively. The authorization server 300 includes an authorization module 600. Further, the data synchronization server 400 includes a data synchronization module 700. Each module is an application program installed on the external memory 211. Processing to be performed by each module will be described in detail below.

FIGS. 4A, 4B, 4C, 4D, and 4E illustrate data tables that the authorization server 300 can store in the external memory 211. It is feasible to configure the system in such a way as to store the data tables in another server that is accessible via the LAN 101. FIG. 4A illustrates a user management table 1000. The user management table 1000 is composed of two data fields dedicated to user ID (see 1001) and password (see 1002), respectively. The authorization server 300 has a function of authenticating each user by verifying a set of information about the user ID and the password and has a function of generating authentication information if the verification has been successfully completed.

FIG. 4B illustrates a client management table 1100. The client management table 1100 is composed of four data fields dedicated to client ID (see 1101), client name (see 1102), password (see 1103), and redirect URI (see 1104), respectively. When the authorization module 600 transfers the authority to other service by using OAuth protocols, the authorization module 600 refers to the client management table 1100 and confirms that the transfer target service is already registered as an OAuth client. FIG. 4C illustrates a device management table 1200. The device management table 1200 is composed of four data fields dedicated to user ID (see 1201), device ID (see 1202), device name (see 1203), and device token (see 1204), respectively.

A data stored in the user ID field 1201 can be referred to in identifying an owner of the device. The user ID (see 1201) in the device management table 1200 and the user ID (see 1001) in the user management table 1000 are associated with each other and are mutually referable. A data stored in device ID field 1202 can be referred to in uniquely identifying each device (200, 220, or 240). Namely, the device ID is identification information that can uniquely identify each device. A data stored in the device name field 1203 can be used in a screen example described below. The identification information is not limited to the device ID. For example, the identification information can be a device name. A data stored in the device token field 1204 can be issued by a Push notification system and can be used to transmit a Push notification to a device. A device, if it supports the Push notification, can store a desired value in the device token field 1204. The Push notification in the data synchronization among devices will be described in detail below.

FIG. 4D illustrates a synchronization data management table 1300. The synchronization data management table 1300 is composed of five data fields dedicated to data ID (see 1301), user ID (see 1302), update division (see 1303), file path (see 1304), file name (see 1305) and receive time (see 1306), respectively. If necessary, the synchronization data management table 1300 can additionally include a field dedicated to synchronization time. The synchronization data management table 1300 can be used in the processing as described in detail below.

FIG. 4E illustrates an authorization token management table 1400. The authorization token management table 1400 is composed of nine data fields dedicated to access token ID (see 1401), token type (see 1402), expiration date (see 1403), scope ID (see 1404), refresh token ID (see 1405), refresh deadline (see 1406), client ID (see 1407), user ID (see 1408), and redirect URI (see 1409), respectively. The authorization token management table 1400 can be used in the processing as described in detail below.

FIG. 5 is a sequence diagram illustrating token acquisition and data synchronization according to the present exemplary embodiment. First, in step S1.1, a user performs a data update operation via the device 200. The data update operation is, for example, adding a file to a subordinate directory managed by the data synchronization application 500. Another example of the data update operation is updating or deleting a file in the subordinate directory. In the present exemplary embodiment, the subordinate directory includes a directory in a memory of the device 200 and a directory in a memory of an external apparatus accessible from the device 200 via the network.

In step S1.2, the data synchronization application 500 detects the data update operation in the device 200 and requests the data synchronization module 700 to perform data synchronization processing. In this case, the data synchronization application 500 transmits synchronization data information to the data synchronization module 700. The synchronization data information includes device ID, unique ID issued by the device 200, user ID of a device owner, data update content of the device 200, file path, and file name. The data update content of the device 200 indicates the type of the update operation (i.e., any of addition, update, and deletion of the data).

The file path is a relative path from the subordinate directory managed by the data synchronization application 500. Hereinafter, the device ID and the unique ID are collectively referred to as "data ID." If the data synchronization module 700 receives the synchronization data information, the data synchronization module 700 performs the following processing. The data synchronization module 700 stores the data ID in the data ID field 1301 of the synchronization data management table 1300. The data synchronization module 700 stores the user ID of the device owner in the user ID field 1302 of the synchronization data management table 1300. The data synchronization module 700 stores the data update information in the device 200 in the update division field 1303 of the synchronization data management table 1300. The data synchronization module 700 stores the file path in the file path field 1304 of the synchronization data management table 1300. The data synchronization module 700 stores the file name in the file name field 1305 of the synchronization data management table 1300. Further, in a case where the data update content is addition or update, the data synchronization application 500 transmits the file itself to the data synchronization module 700. In this case, the data synchronization module 700 stores the reception time of the synchronization data information in the receive time field 1306 of the synchronization data management table 1300.

In step S1.3, the data synchronization module 700 transmits an OAuth authorization request to the URL of an authorization endpoint of the authorization module 600, by redirect of a browser of the data synchronization application 500. In this case, parameters included in the authorization request are response type (required for an authorization code), client ID, redirect URI, and scope ID. The scope ID is a parameter indicating an authority range for which the authorization by the OAuth is expected. In the present exemplary embodiment, the scope ID designates acquisition of a device list. The authorization request is an HTTP Get method or an HTTP Post method.

When the authorization module 600 receives the authorization request, the authorization module 600 performs the following processing to verify the authorization request. The authorization module 600 confirms that the response type and the client ID are included as parameters in the authorization request. The authorization module 600 confirms that a transmission source of the authorization request is an already registered client. To this end, the authorization module 600 confirms that a value in the client ID field 1101 of a record acquirable from the client management table 1100 coincides with the client ID included in the authorization request.

Figure 6A:
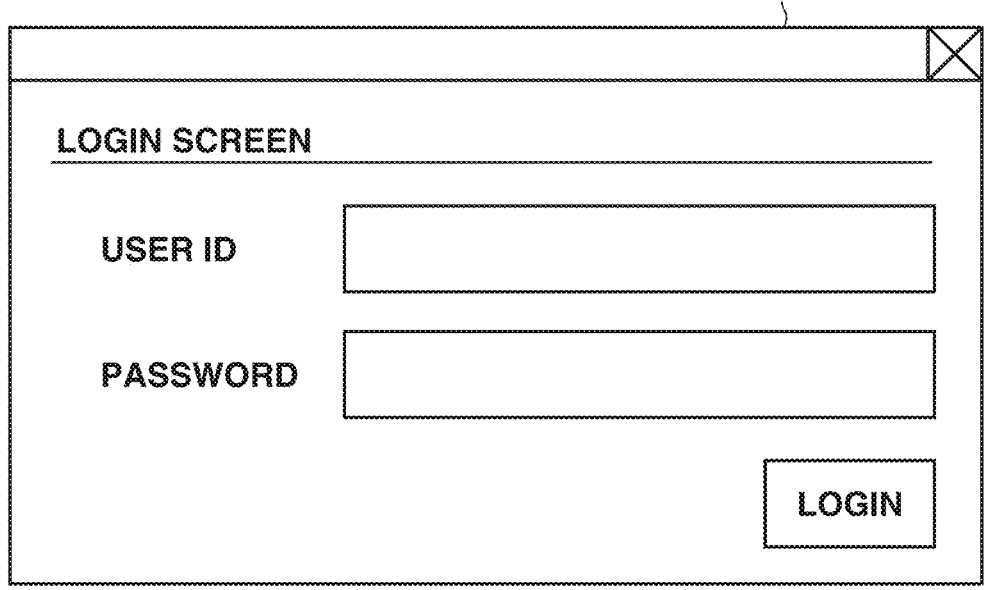
FIGS. 6A and 6B illustrate examples of a login screen and an authorization confirmation screen according to the present exemplary embodiment.

The authorization module 600 confirms that the redirect URI included in the authorization request coincides with redirect URI of the already registered client. To this end, the authorization module 600 refers to the client management table 1100 and acquires an intended record selected on condition that the client ID value thereof (see 1101) coincides with the client ID included in the authorization request. The authorization module 600 confirms that the redirect URI value included in the authorization request coincides with the redirect URI value (see 1104) registered in the client management table 1100. If the authorization module 600 receives the authorization request (see step S1.3), then in step S1.4, the authorization module 600 transmits a response including a login screen 1801 illustrated in FIG. 6A to the browser of the data synchronization application 500. The login screen 1801 is an authentication screen dedicated to user authentication.

In step S1.5, the user performs a login operation by inputting user ID and password via the login screen 1801 displayed by the browser. The authorization module 600 verifies whether the received data set (i.e., the user ID and the password) coincide with information registered in the user management table 1000. If the coincidence is confirmed, it can be determined that the user having input the above-mentioned data set (i.e., the user ID and the password) is an authorized user. If no problem occurs in the verification, then in step S1.6, the authorization module 600 generates login information linked with the user ID. In a case where valid login information is already generated through the login processing having been once completed, the above-mentioned processing in steps S1.4 to S1.6 can be skipped.

Figure 6B:
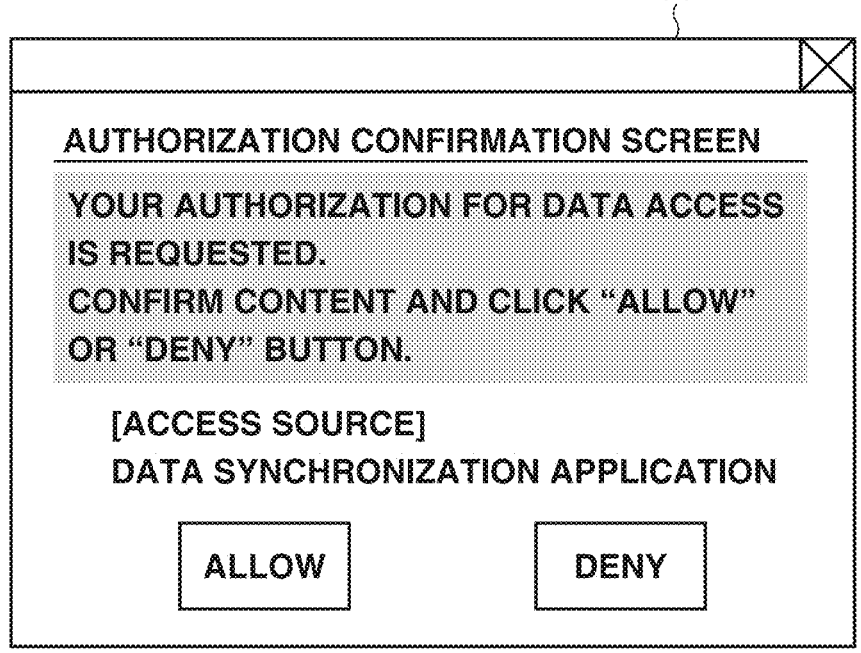

If the generation of the valid login information is completed, then in step S1.7, the authorization module 600 displays an authorization confirmation screen 1802 illustrated in FIG. 6B on the browser of the data synchronization application 500. The authorization confirmation screen 1802 is a screen usable to confirm whether the user permits to transfer the authority to access the user own device list managed by the authorization server 300 to the data synchronization module 700 based on the scope ID. If transferring the authority to the data synchronization module 700 with respect to acquisition of the user own device list is acceptable, the user selects "Allow." If transferring the authority to the data synchronization module 700 with respect to acquisition of the user own device list is unacceptable, the user selects "Deny." Through the above-mentioned selection, the user can instruct the transfer of the authority.

In step S1.8, if the user selects "Permit" on the authorization confirmation screen 1802, namely, if the user performs the authorization operation, the data synchronization application 500 performs the following processing. In step S1.9, the data synchronization application 500 transmits an authorization confirmation result to the authorization module 600. Upon receiving the permission, the authorization endpoint of the authorization module 600 performs the following processing. The authorization endpoint of the authorization module 600 issues an authorization code and registers the issued authorization code in the authorization token management table 1400. In this case, the authorization endpoint of the authorization module 600 registers the issued token ID in the authorization token ID field 1401. The authorization endpoint of the authorization module 600 registers the authorization code in the token type filed 1402. The authorization endpoint of the authorization module 600 registers expiration date of the authorization token in the expiration date field 1403. The authorization endpoint of the authorization module 600 registers the scope ID, which indicates authority to be transferred to the data synchronization module 700, in the scope ID field 1404. The authorization endpoint of the authorization module 600 registers the client ID included in the authorization request in the client ID field 1407. The authorization endpoint of the authorization module 600 registers the user ID associated with the authentication information transmitted from the data synchronization module 700 in the user ID field 1408. The authorization endpoint of the authorization module 600 registers the redirect URI included in the authorization request in the redirect URI field 1409.

Then, in step S1.10, the authorization module 600 transmits an authorization response to the data synchronization module 700 via the browser of the data synchronization application 500. The authorization response includes the authorization code. When the authorization code is transmitted to a token endpoint described below, the authorization code can be replaced by an authorization token. The way of replacing the authorization code by the authorization token as mentioned above brings an effect of enhancing the security. Even if the authorization code is stolen by a malicious third party, the stolen authorization code cannot be directly used to perform a data synchronization operation.

In step S1.8, if the user selects "Refuse" on the authorization confirmation screen 1802, the data synchronization application 500 performs the following processing. In step S1.9, the data synchronization application 500 transmits the authorization confirmation result to the authorization module 600. In step S1.10, the authorization module 600 transmits an error response to the data synchronization application 500. The error response includes an error code "access_denied" determined according to the OAuth. If the data synchronization application 500 receives the error response, the data synchronization application 500 displays an error message on the screen to inform that the authorization has not been obtained. Then, the system terminates the processing of the flowchart illustrated in FIG. 5.

If the data synchronization module 700 receives the authorization response, then in step S1.11, the data synchronization module 700 transmits a token request to URL of the token endpoint of the authorization module 600. The token request is an HTTP Post request. The token request includes information (e.g., authorization code, client ID, password, and redirect URI) acquired from the authorization response.

When the authorization module 600 receives the token request, the authorization module 600 performs the following verification processing. The authorization module 600 verifies that the token request (transmitted in step S1.11) includes essential parameters. More specifically, the authorization module 600 verifies that the token request (transmitted in step S1.11) includes data relating to grant type, authorization code, redirect URI, client ID, and password. The authorization module 600 confirms that the grant type value is "authorization_code." The authorization module 600 verifies that the authorization code of the token request (transmitted in step S1.11) has been issued by the authorization module 600. In this case, the authorization module 600 confirms that the authorization token ID of the authorization code included in the received token request is already registered in the authorization token management table 1400. Further, the authorization module 600 confirms the expiration date 1403 and verifies that the authorization token is yet valid.

The authorization module 600 verifies whether the combined data set of the client ID and the password included in the token request (transmitted in step S1.11) coincides with a combined data set registered in the client ID field 1101 and the password field 1103 of the client management table 1100. If no problem occurs in the verification of the token request (transmitted in step S1.11), then in step S1.12, the authorization module 600 issues an authorization token and transmits the issued authorization token to the data synchronization module 700. In this case, the authorization module 600 registers the authorization token in the authorization token management table 1400 in the following manner.

The authorization module 600 registers ID information about the issued token in the authorization token ID field 1401. The authorization module 600 registers the authorization token in the token type field 1402. The authorization module 600 registers client ID, user ID, and scope ID (i.e., data taken over from the authorization code) in the expiration date field 1403, the client ID field 1407, and the user ID field 1408. In this case, the authorization module 600 issues a refresh token to refresh the authorization token and registers information about the issued refresh token in the refresh token ID field 1405 and the refresh deadline field

1406. Then, the authorization code is replaced by the authorization token. For security reasons, using the authorization code is only allowed once. As a method for the processing mentioned above, it is useful to delete an authorization code record from the authorization token management table 1400 or provide a deletion state management column to allocate flag information.

If the data synchronization module 700 receives the authorization token, then in step S1.13, the data synchronization module 700 transmits a synchronization device list request to URL of a device list acquisition endpoint of the authorization module 600. The synchronization device list request (transmitted in step S1.13) includes the authorization token included in the token response (transmitted in step S1.12). When the authorization module 600 receives the synchronization device list acquisition request (transmitted in step S1.13), the authorization module 600 performs the following processing to verify the authorization token. The authorization module 600 acquires an intended record, which is coincident with respect to the token ID of the authorization token, from the authorization token management table 1400. The authorization module 600 refers to a record value in the expiration date field 1403 and confirms that the authorization token is yet valid. Further, the authorization module 600 refers to a record value in the scope ID field 1404 and confirms that the scope ID includes "acquisition of device list." Thus, it can be confirmed that the device list acquisition authority is already transferred from the authorization module 600 to the data synchronization module 700.

If the user own device list acquisition authority is already transferred to the data synchronization module 700, then in step S1.14, the authorization module 600 acquires the user own device list from the device management table 1200 and transmits the acquired user own device list to the data synchronization module 700. The user own device list transmitted in this case is a record in the device management table 1200, in which a value in the user ID field 1201 coincides with the user ID included in the synchronization device list request (transmitted in step S1.13) and a value in the device ID field 1202 does not coincide with the device ID included in the synchronization device list request (transmitted in step S1.13). If the data synchronization module 700 receives the synchronization device list response (see step S1.14), then in step S1.15, the data synchronization module 700 transmits a push notification about the data ID 1301 to the data synchronization application (520 etc.) of the device included in the user own device list, using the device token 1505.

Subsequently, in step S1.16, the data synchronization application 520 of the device 220 receives the push notification and transmits a data synchronization request to the data synchronization module 700. Parameters included in the data synchronization request in this case are user ID, device ID, and data ID received via the push notification. If the data synchronization module 700 receives the data synchronization request from the data synchronization application 520 of the device 220, the data synchronization module 700 transmits the data update content. In this case, to acquire the data update content, the data synchronization module 700 refers to the synchronization data management table 1300 and acquires an intended record selected on condition that the data ID value (see 1301) coincides with the data ID included in the data synchronization request. The data synchronization application 520 acquires the added/updated file from the data synchronization server 400, with reference to the received data update content. The data synchronization application 520 reflects the acquired file in the device 220. Further, the data synchronization application 520 deletes a corresponding file of the device 220 with reference to the data update content.

According to the present exemplary embodiment, the server can manage a user own device list in aggregative fashion and can provide the user own device list to a service only when the user permits.

Next, a secondary exemplary embodiment according to the present invention will be described in detail below with reference to attached drawings. In the first exemplary embodiment, there is a problem that a user cannot confirm a target device to be subjected to the data synchronization processing. In general, a user sets a data synchronization target device beforehand at the time when the user purchases its own device. However, the user may fail to perform the above-mentioned setting. Further, when a device is transferred from one user to another user, the former user may fail to reset the data synchronization settings. In such a case, when the latter user performs a data synchronization operation, the data synchronized destination may be an unintended device. Therefore, the secondary exemplary embodiment intends to enable a user to visually confirm a target device to be subjected to the data synchronization processing and perform data synchronization processing only for the confirmed device.

Figure 8:
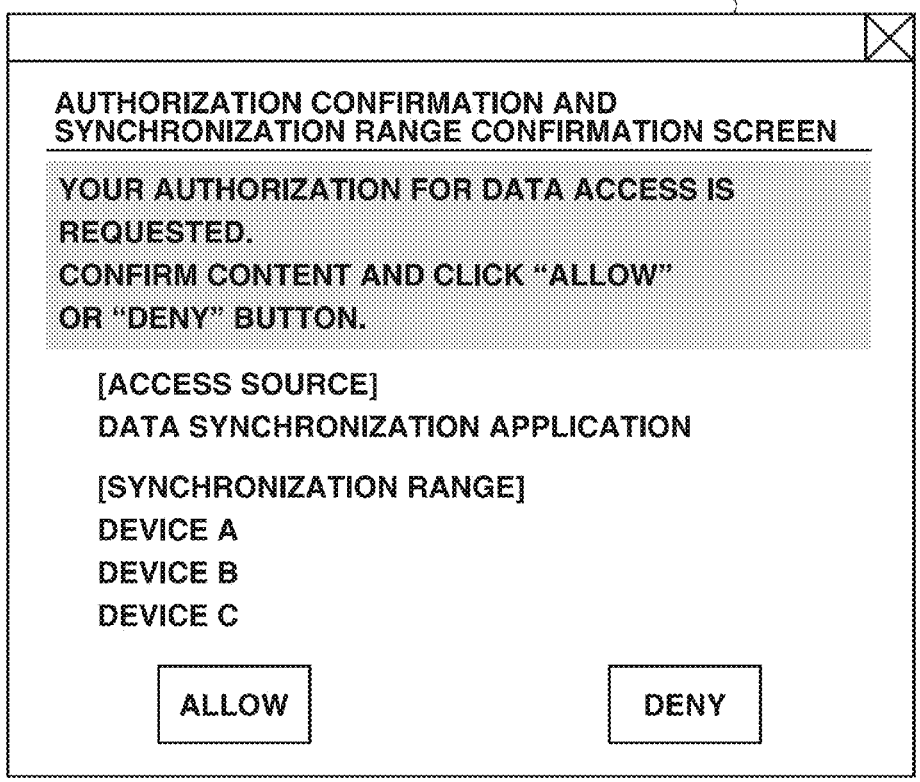
FIG. 8 illustrates an example of an authorization confirmation screen according to the second exemplary embodiment of the present invention.

FIG. 7 is a sequence diagram illustrating data synchronization according to the second exemplary embodiment of the present invention. Processing according to the present exemplary embodiment is substantially similar to that of the above-mentioned exemplary embodiment described with reference to the sequence diagram illustrated in FIG. 5. Therefore, only characteristic features not described in the above-mentioned exemplary embodiment will be described in detail below. If the generation of the valid login information is completed, then in step S2.7, the authorization module 600 performs the following processing. The authorization module 600 acquires the data synchronization target device list. The data synchronization target device list is the one stored in the device management table 1200. More specifically, to acquire the data synchronization target device list, the authorization module 600 refers to the device management table 1200 and acquires an intended record selected on condition that a value in the user ID field 1201 coincides with the user ID included in the request and a value in the device ID field 1202 does not coincide with the device ID of the device 200. In step S2.7, the authorization module 600 sends a response including the data synchronization target own device list to the data synchronization application 500. The data synchronization application 500 displays an authorization confirmation screen 1803 illustrated in FIG. 8.

In this case, the display contents of the authorization confirmation screen 1803 include not only a message confirming user's decision about the transfer of the authority but also the data synchronization target own device list. For example, the display contents of the authorization confirmation screen 1803 include device names. If desired, the display contents of the authorization confirmation screen 1803 can include device ID of each device in addition to the device name. Displaying identification information about the device in the manner described above enables the user to recognize each target device to be subjected to the synchronization processing. Through the above-mentioned display, each user can visually confirm the data synchronization target device while viewing the authorization confirmation screen 1803. Subsequently, the data synchronization processing can be performed on the device visually confirmed by the user through processing in step S2.8 and subsequent steps illustrated in FIG. 7. According to the illustrated example, the authorization confirmation screen 1803 is a single screen that can realize a simultaneous display of authorization confirmation and data synchronization target device list. However, it is useful to provide two separate screens that cooperatively constitute an authorization confirmation screen, one of which is a screen dedicated to the display of authorization confirmation and the other of which is a screen dedicated to the display of data synchronization target device list.

According to the second exemplary embodiment of the present invention, each user can confirm a target user own device list to be subjected to the data synchronization processing at authorization confirmation timing.

Next, a third exemplary embodiment of the present invention will be described in detail below with reference to attached drawings. The second exemplary embodiment has been described on the assumption that addition, change, or deletion of a user own device occurs in the device management table 1200 after the confirmation of the data synchronization target device list on the authorization confirmation screen is completed and before the data synchronization processing starts. In this case, there is a problem that the data synchronization may not be surely performed for the target device confirmed on the authorization confirmation screen. On the other hand, the data synchronization may be erroneously performed for a device other than the target device confirmed on the authorization confirmation screen. Therefore, the third exemplary embodiment intends to surely perform data synchronization processing for the data synchronization target device list confirmed on the authorization confirmation screen even when addition, change, or deletion of a user own device occurs in the device management table 1200 after the above-mentioned confirmation of the target device on the authorization confirmation screen is completed and before the data synchronization processing starts.

FIG. 9 illustrates a synchronization device storage table 1500 according to the third exemplary embodiment of the present invention. The synchronization device storage table 1500 is composed of five data fields dedicated to authorization token ID (see 1501), user ID (see 1502), device ID (see 1503), device name (see 1504), and device token (see 1505), respectively. The synchronization device storage table 1500 can be used in the processing as described in detail below.

Figure 10:
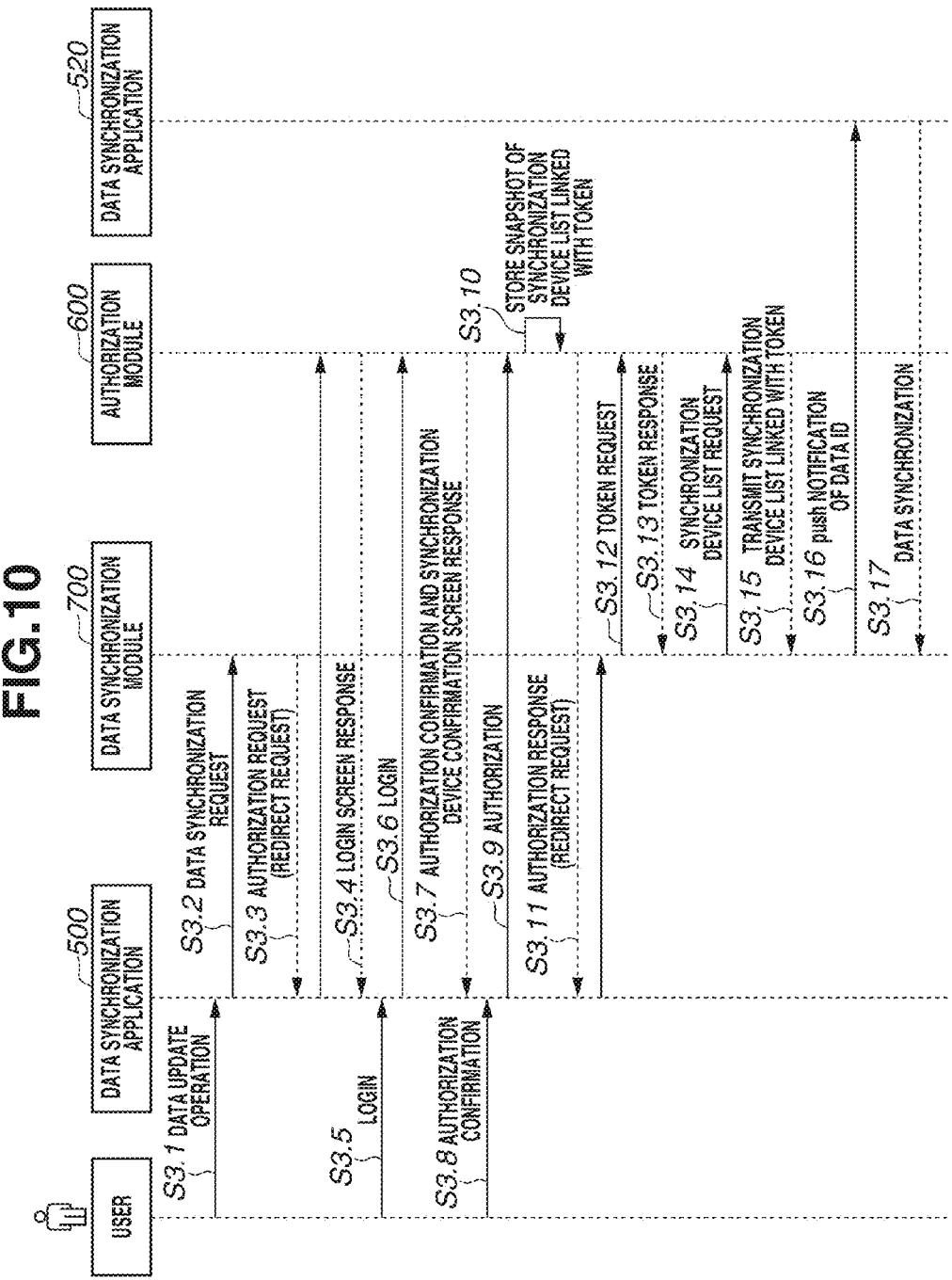
FIG. 10 is a sequence diagram according to the third exemplary embodiment of the present invention.

FIG. 10 illustrates a data synchronization sequence according to the third exemplary embodiment of the present invention. Processing according to the present exemplary embodiment is substantially similar to that of the above-mentioned exemplary embodiment described with reference to the sequence diagram illustrated in FIG. 7. Therefore, only characteristic features not described in the above-mentioned exemplary embodiment will be described in detail below. In step S3.10, the authorization module 600 stores the data synchronization target own device list displayed on the authorization confirmation screen (see step S3.7) in the synchronization device storage table 1500 while linking it with the token ID 1401. The data synchronization target own device list stored in association with the token ID is referred to as "snapshot." When the authorization module 600 stores the snapshot in the synchronization device storage table 1500, if there is any older snapshot having been stored previously, the authorization module 600 deletes the older snapshot and stores the new snapshot in the synchronization device storage table 1500. The snapshot will be described in detail below. In step S3.15, the authorization module 600 transmits the data synchronization target device list to the data synchronization module 700. The data synchronization target device list to be transmitted in this case is a record in the synchronization device storage table 1500 that coincides with the token received in step S3.14 with respect to the token ID.

The reason why the usage of the snapshot is useful is described below. The data synchronization target device list is the one stored in the device management table 1200. If the data of the device management table 1200 is rewritten after the above-mentioned authorization confirmation (step S3.9 in the third exemplary embodiment) before the device data synchronization (step S3.14 in the third exemplary embodiment), there will be a possibility that the data synchronization is erroneously performed for a device different from the data synchronization target device list visually confirmed on the authorization confirmation screen. Therefore, when a user confirms the data synchronization target device list on the authorization confirmation screen, the authorization module 600 stores the confirmed device list as a snapshot in the synchronization device storage table 1500. Then, the data synchronization target device list is acquired from the synchronization device storage table 1500 when the data synchronization processing is performed. Hereinafter, through processing in steps S3.16 and S3.17 illustrated in FIG. 10, the data synchronization processing can be performed only for the device confirmed on the authorization confirmation screen.

By using the snapshot it is feasible to surely perform the data synchronization processing for the device confirmed on the authorization confirmation screen, even when the user own device list registered in the device management table 1200 has been changed after the authorization confirmation (i.e., step S3.9 in the third exemplary embodiment) before the device data synchronization (i.e., step S3.14 in the third exemplary embodiment). As an exemplary storing method, the snapshot can be stored in a DB table or can be stored in the memory.

According to the third exemplary embodiment, it is feasible to surely perform data synchronization processing for the device confirmed on the authorization confirmation screen even if addition, change, or deletion of a user own device occurs in the device management table 1200 after the data synchronization target device list is confirmed on the authorization confirmation screen and before the data synchronization starts.

Next, a fourth exemplary embodiment of the present invention will be described in detail below with reference to an attached drawing. According to the third exemplary embodiment, even when there is not any change in the data synchronization target device list, the user is required to perform the authorization confirmation for the same content each time the data synchronization processing is performed because the authorization confirmation screen is displayed. To solve the above-mentioned problem, the fourth exemplary embodiment intends to perform the data synchronization processing without displaying the authorization confirmation screen if there is not any change in the data synchronization target device list.

Figure 11:
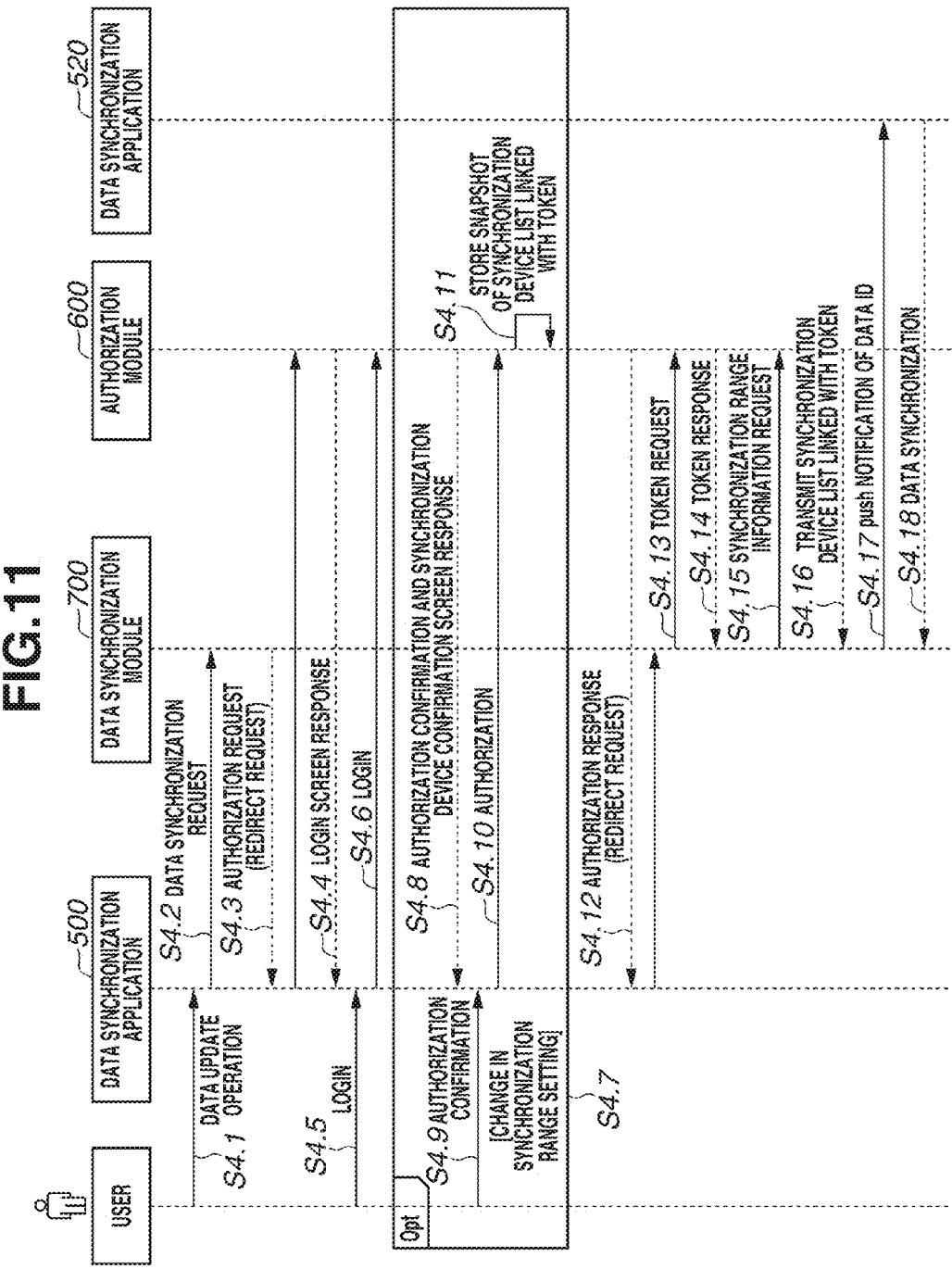
FIG. 11 is a sequence diagram according to a fourth exemplary embodiment of the present invention.

FIG. 11 is a sequence diagram illustrating data synchronization according to the fourth exemplary embodiment of the present invention. Processing according to the present exemplary embodiment is substantially similar to that of the above-mentioned exemplary embodiment described with reference to the sequence diagram illustrated in FIG. 10.

Therefore, only characteristic features not described in the above-mentioned exemplary embodiments will be described in detail below. In step S4.7, the authorization module 600 performs the following processing to confirm whether there is any change in the data synchronization target device list.

The authorization module 600 acquires user ID from the login information (see step S4.6). The authorization module 600 refers to the device management table 1200 and acquires an intended record selected on condition that the data in the user ID field 1201 coincides with the acquired user ID, as a present data synchronization target device list. Then, to acquire a snapshot of a previous data synchronization target device list, the authorization module 600 refers to the synchronization device storage table 1500 and acquires an intended record selected on condition that the data in the user ID field 1502 coincides with the user ID.

The authorization module 600 confirms whether there is a change in the data synchronization target device list based on a comparison between the present data synchronization target device list and the snapshot of the previous data synchronization target device list. If there is not any change in the data synchronization target device list, the authorization module 600 skips the processing in steps S4.8 to S4.11. Hereinafter, through sequential steps S4.12 to S4.18 illustrated in FIG. 11, the system performs data synchronization processing without displaying the authorization confirmation screen in the case where there is not any change in the data synchronization target device list.

According to the fourth exemplary embodiment, if there is not any change in the data synchronization target device list, it is unnecessary for a user to input an authority transfer instruction via the authorization confirmation screen. Therefore, usability can be improved significantly.

Next, a fifth exemplary embodiment of the present invention will be described in detail below with reference to attached drawings.

In the third exemplary embodiment, the system performs the data synchronization processing for all devices registered in the user own device list displayed on the authorization confirmation screen. However, there will be a case where a user wants to select a device to be subjected to the data synchronization processing. Therefore, the fifth exemplary embodiment intends to enable each user to determine whether to perform the data synchronization processing for each device. Processing according to the present exemplary embodiment is substantially similar to that of the above-mentioned exemplary embodiment described with reference to the sequence diagram illustrated in FIG. 10. Therefore, only characteristic features not described in the above-mentioned exemplary embodiment will be described in detail below.

Figure 13:
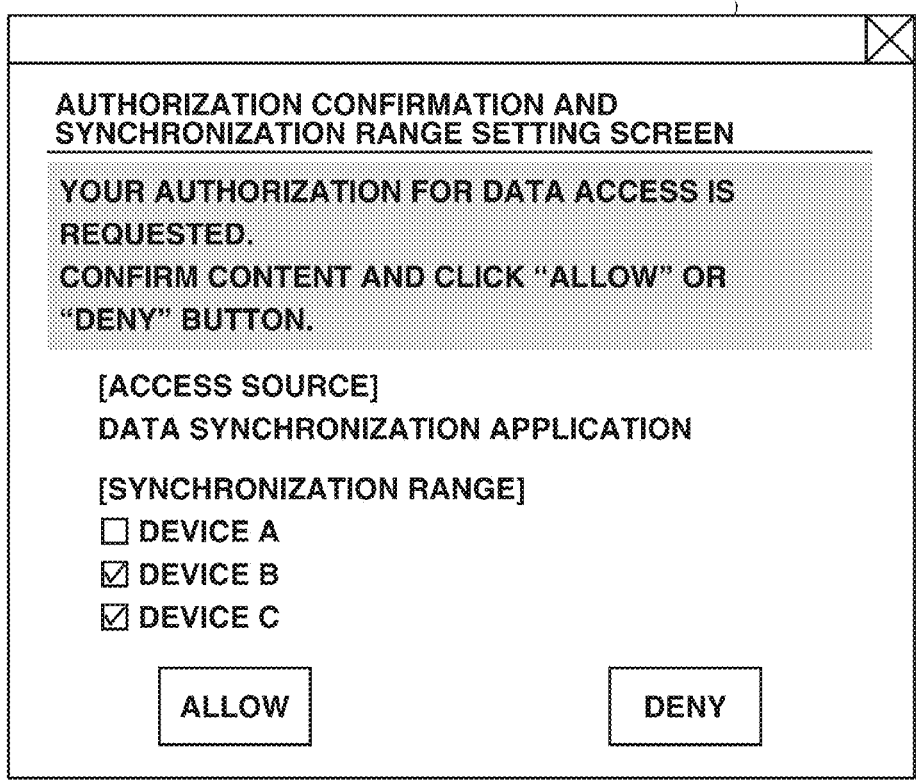
FIG. 13 illustrates an example of the screen according to the fifth exemplary embodiment of the present invention.

If the user is in a login state, then in step S5.7, the authorization module 600 displays an authorization confirmation screen 1804 illustrated in FIG. 13 on the browser of the data synchronization application 500. The display contents of the authorization confirmation screen 1804 include not only a message confirming user's decision about the transfer of the authority but also selection columns dedicated to respective data synchronization target devices. In step S5.8, the user selects "Permit" or "Refuse" for each designated data synchronization target device on the authorization confirmation screen 1804. Then, in step S5.9, the data synchronization application 500 transmits the approved data synchronization target device list to the authorization module 600.

Figure 12:
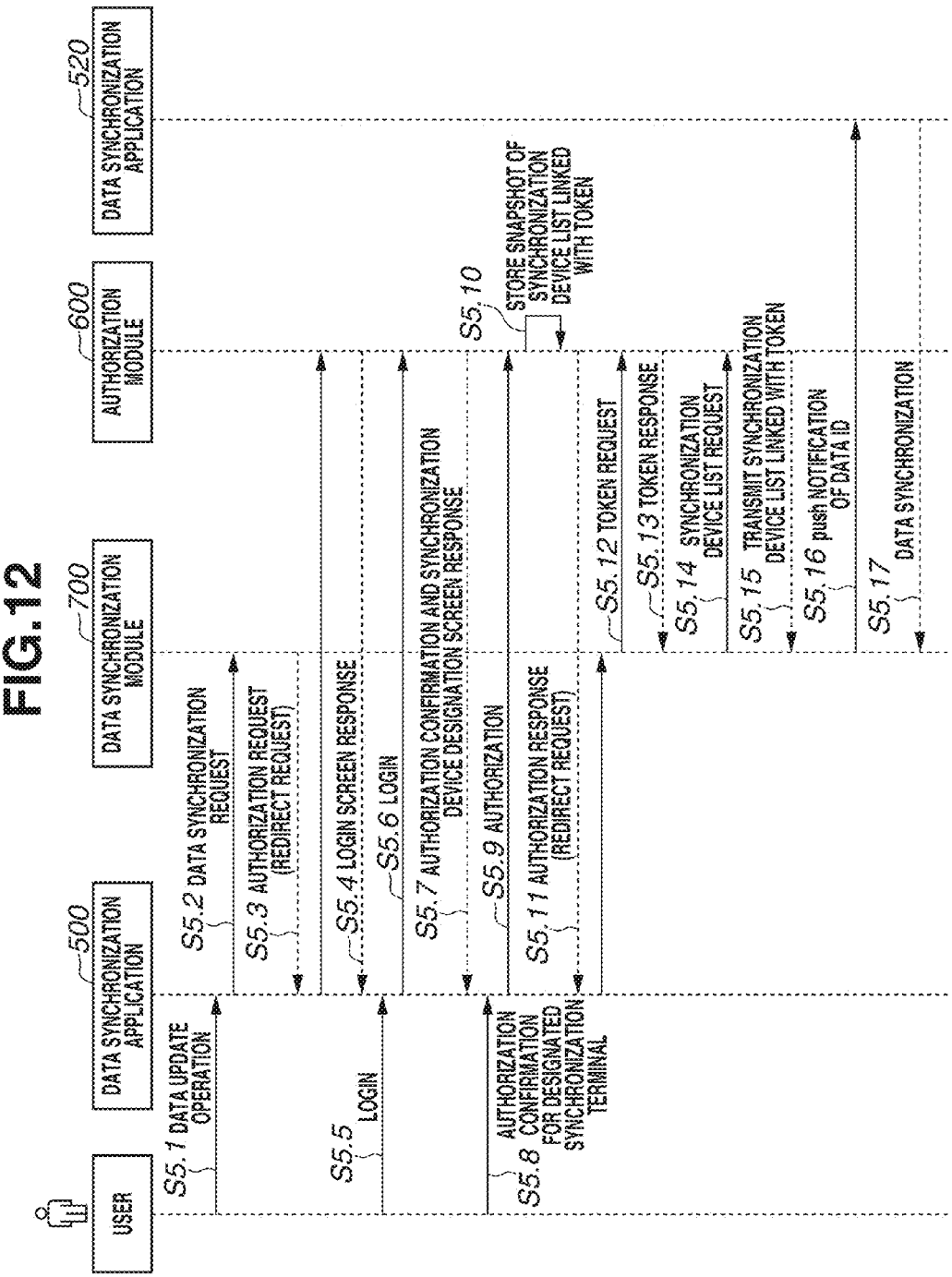
FIG. 12 is a sequence diagram according to a fifth exemplary embodiment of the present invention.

In step S5.10, the authorization module 600 stores the data synchronization target device list received in step S5.9 in the synchronization device storage table 1500 while associating it with the token ID 1305. In this case, if there is any older snapshot having been stored previously, the authorization module 600 deletes the older snapshot from the synchronization device storage table 1500. Hereinafter, through sequential steps S5.11 to S5.17 illustrated in FIG. 12, the system performs data synchronization processing for the device designated by the user on the authorization confirmation screen.

According to the fifth exemplary embodiment, each user can designate a target device to be subjected to the data synchronization processing via the authorization confirmation screen.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A server relied by a user can manage a user own device list in aggregative fashion and can provide the user own device list to a server only when the user permits.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-142726, filed Jul. 10, 2014, which is hereby incorporated by reference herein in its entirety.

What is claimed is:

1. A data synchronizing system including a device that can update data, a server system that causes another device to synchronize with the updated data in response to the update of the data by the device, and an authorization server, the data synchronizing system comprising:
   at least a processor; and
   at least a memory coupled to the at least processor and having stored thereon instructions that, when executed by the at least processor, cause the at least processor to act as:
   an authentication unit configured to determine whether a user is an authorized user based on authentication information input by the user via an authentication screen displayed by the device;
   an issuance unit configured to issue authority information indicating that authority of the user has been transferred to the server system in a case where the user determined by the authentication unit as the authorized user inputs an instruction permitting the authorization server to transfer the authority of the user to the server system via an authorization confirmation screen displayed by the device;

a transmission unit configured to transmit identification information about the device associated with the user to the server system based on the authority information transmitted when the server system requests the authorization server to provide identification information about a data synchronization target device, wherein the server system is configured to cause said other device to synchronize with the updated data in response to confirmation of identification information about said other device included in the identification information about the device transmitted by the transmission unit;

a providing unit configured to provide the authorization confirmation screen, including a name of the server system that is an access source and further including a name of the data synchronization target device of the updated data and selection items for enabling the user to select the data synchronization target device from among a plurality of target devices, to the device based on the identification information about the device associated with the user; and a storage unit, wherein the issuance unit is configured to issue the authority information indicating that the authority of the user has been transferred to the server system and associate the authority information with identification information about the data synchronization target device selected by the user, if the user selects the data synchronization target device and inputs an instruction permitting the authorization server to transfer the authority of the user to the server system via the authorization confirmation screen provided by the providing unit, wherein the storage unit stores the identification information corresponding to the device selected by the user via the authorization confirmation screen into a terminal management table and stores, as a snapshot, the identification information corresponding to the device selected by the user via the authorization confirmation screen into a synchronization terminal table, and wherein the providing unit compares the identification information of the device that is a current data synchronization target with the snapshot to check whether there is a change in the device that is to be data synchronized or not, and does not provide the authorization confirmation screen if there is no change.

2. The data synchronizing system according to claim 1, wherein the issuance unit issues the authority information without receiving the instruction permitting the authorization server to transfer the authority of the user to the server system, if the identification information about the device associated with the user is identical to the identification information about the device stored by the storage unit when the issuance unit issues the authority information.

3. The data synchronizing system according to claim 1, wherein the providing unit does not provide the authorization confirmation screen to the device if the identification information about the device associated with the user is identical to the identification information about the device stored by the storage unit when the authority information is issued, and the issuance unit issues the authority information without receiving an instruction permitting the authorization server to transfer the authority of the user to the server system.

4. A method for controlling a data synchronizing system that includes a device that can update data, a server system that causes another device to synchronize with the updated data in response to the update of the data by the device, and an authorization server, the control method comprising:

determining whether a user is an authorized user based on authentication information input by the user via an authentication screen displayed by the device;

issuing authority information indicating that authority of the user has been transferred to the server system in a case where the user determined as the authorized user inputs an instruction permitting the authorization server to transfer the authority of the user to the server system via an authorization confirmation screen displayed by the device;

transmitting identification information about the device associated with the user to the server system based on the authority information transmitted when the server system requests the authorization server to provide identification information about a data synchronization target device, wherein the server system is configured to cause said other device to synchronize with the updated data in response to confirmation of identification information about said other device included in the identification information about the device;

providing the authorization confirmation screen, including a name of the server system that is an access source and further including a name of the data synchronization target device of the updated data and selection items for enabling the user to select the data synchronization target device from among a plurality of target devices, to the device based on the identification information about the device associated with the user; and storing the identification information, wherein issuing comprises issuing the authority information indicating that the authority of the user has been transferred to the server system and associate the authority information with identification information about the data synchronization target device selected by the user, if the user selects the data synchronization target device and inputs an instruction permitting the authorization server to transfer the authority of the user to the server system via the authorization confirmation screen, wherein storing comprises storing the identification information corresponding to the device selected by the user via the authorization confirmation screen into a terminal management table and storing, as a snapshot, the identification information corresponding to the device selected by the user via the authorization confirmation screen into a synchronization terminal table, and wherein providing the authorization confirmation screen comprises comparing the identification information of the device that is a current data synchronization target with the snapshot to check whether there is a change in the device that is to be data synchronized or not, and does not provide the authorization confirmation screen if there is no change.

5. A non-transitory storage medium storing a program that can be executed by a data synchronizing system including a device that can update data, a server system that causes another device to synchronize with the updated data in response to the update of the data by the device, and a communicatable authorization server, the program comprising:

determining whether a user is an authorized user based on authentication information input by the user via an authentication screen displayed by the device;

issuing authority information indicating that authority of the user has been transferred to the server system in a case where the user determined by the authentication as the authorized user inputs an instruction permitting the authorization server to transfer the authority of the user to the server system via an authorization confirmation screen displayed by the device;

transmitting identification information about the device associated with the user to the server system based on the authority information transmitted when the server system requests the authorization server to provide identification information about a data synchronization target device, wherein the server system causes another device to synchronize with the updated data in response to confirmation of identification information about said other device included in the transmitted identification information about the device;

providing the authorization confirmation screen, including a name of the server system that is an access source and further including a name of the data synchronization target device of the updated data and selection items for enabling the user to select the data synchronization target device from among a plurality of target devices, to the device based on the identification information about the device associated with the user; and storing the identification information, wherein issuing comprises issuing the authority information indicating that the authority of the user has been transferred to the server system and associate the authority information with identification information about the data synchronization target device selected by the user, if the user selects the data synchronization target device and inputs an instruction permitting the authorization server to transfer the authority of the user to the server system via the authorization confirmation screen, wherein storing the identification information comprises storing the identification information corresponding to the device selected by the user via the authorization confirmation screen into a terminal management table and storing, as a snapshot, the identification information corresponding to the device selected by the user via the authorization confirmation screen into a synchronization terminal table, and wherein providing the authorization confirmation screen comprises comparing the identification information of the device that is a current data synchronization target with the snapshot to check whether there is a change in the device that is to be data synchronized or not, and does not provide the authorization confirmation screen if there is no change.

* * * * *